United States Patent [19]

Wethe et al.

[11] 3,964,019
[45] June 15, 1976

[54] TIMER

[76] Inventors: David A. Wethe, 1570 N. Coast Highway, Laguna Beach, Calif. 92651; Charles W. Behn, 1646 E. 14th St., Santa Ana, Calif. 92701; Richard B. Willetts, 282 Forest Ave., Laguna Beach, Calif. 92651

[22] Filed: Dec. 19, 1973

[21] Appl. No.: 426,203

[52] U.S. Cl............................. 340/73; 340/52 D; 307/294
[51] Int. Cl.².......................................... B60Q 1/34
[58] Field of Search................ 340/73, 74, 75, 55, 340/56, 81, 77, 377, 322, 52 D; 307/141.4, 31, 33, 34, 252, 293, 294; 331/145

[56] References Cited
UNITED STATES PATENTS

| | | | |
|---|---|---|---|
| 3,131,318 | 4/1964 | Snyder | 307/293 |
| 3,200,258 | 8/1965 | Carroll | 307/293 |
| 3,419,733 | 12/1968 | Hornung | 307/141 |
| 3,555,507 | 5/1967 | Burson | 340/56 |
| 3,806,868 | 4/1974 | Portman | 340/56 |

*Primary Examiner*—John W. Caldwell
*Assistant Examiner*—Donnie L. Crosland
*Attorney, Agent, or Firm*—Fulwider Patton Rieber Lee & Utecht

[57] ABSTRACT

There is disclosed a timer for use with a turn signal electrical circuit of a vehicle such as an automobile. The timer includes an audio or visual alarm to indicate to the operator of the vehicle when the turn signals have been actuated for an excessively prolonged period such as caused by failure to cancel the signal after completion of a turn. The timing circuit of the timer employs a silicon controlled rectifier (SCR) with a charging capacitor, which receives a pulsed input from the turn signal circuit, in the triggering circuit of the SCR and in a holding circuit to the SCR to sustain the alarm for several periods of pulsed input from the turn signal circuit. The timer includes a capacitor discharge circuit activated by the brake switch of the vehicle to deactivate the timer when the brake pedal is depressed to avoid premature alarm activation when the vehicle is delayed from turning by traffic or a traffic signal. Preferred embodiments of the timer include a voltage regulating circuit to maintain the preset timing period constant and independent of the electrical loads of the vehicle as well as circuit means to permit fixed adjustability of the duration of the timing period.

6 Claims, 2 Drawing Figures

TIMER

BACKGROUND OF THE INVENTION

This invention relates to an electronic timing circuit and, in particular, relates to a circuit useful to indicate the extended, continued operation of a motor vehicle's turn signals which can result from failure of the self-cancelling mechanism of the turn signals.

The electrical turn signals commonly found on motor vehicles are manually engaged, usually by a lever on the steering column, and are automatically disengaged as the steering wheel is rotated to direct the vehicle out of a completed turn. Frequently, the automatic disengagement means fails to function; e.g., the cancelling mechanism fails or the turn is too slight to activate the cancelling mechanism. Some vehicles also lack a cancelling mechanism.

The audio and visual indicators on the instrument panel of the vehicle are designed to be of limited prominance to avoid unnecessary distraction when the turn signals are operative. As a result, a driver is often unaware that the turn signals have not been cancelled, particularly when travelling at high speeds with substantial engine and wind noise in the vehicle. This results in the often observed vehicle travelling down a highway with its turn signals continuously flashing.

A vehicle exhibiting improperly flashing turn signals is an annoyance to other drivers. Cautious drivers attempt to avoid the vehicle and the vehicle then impedes traffic. Other drivers ignore the vehicle and this creates a harzardous situation when the vehicle does turn.

It is, therefore, desirable to provide warning means having a prominent, visual and/or audible, indicating means which is activated when the turn signals have remained operative for an abnormally extended period. Such a warning means should not, however, be activated by extended periods of operation of the turn signals which are caused by delays in turning of the vehicle which are experienced before turning when waiting for a traffic signal or for traffic to clear an intersection. The warning means, preferably, should also be unaffected by the use of other electrical accessories on the vehicle such as an air conditioner, and should be compatible with most automotive electrical systems to permit retrofitting without any revisions to the existing electrical systems.

BRIEF STATEMENT OF THE INVENTION

This invention comprises a supplementary timer having a timing circuit with suitable and prominent warning means which is compatible with typical turn signal circuits of conventional automobiles. The timing circuit activates an alarm means after a timing period of a preset duration of turn signal operation. If the driver does not cancel the signal, the alarm emits repeated audio or visual indication after which the circuit is reset to permit a repeated turn signal operation for the preset duration. If the brakes are activated, as typical in negotiating a turn or while waiting at a traffic signal, the timing circuit is reset and delayed in starting the timing period until the brake is released.

DESCRIPTION OF PREFERRED EMBODIMENTS

Figure 1:
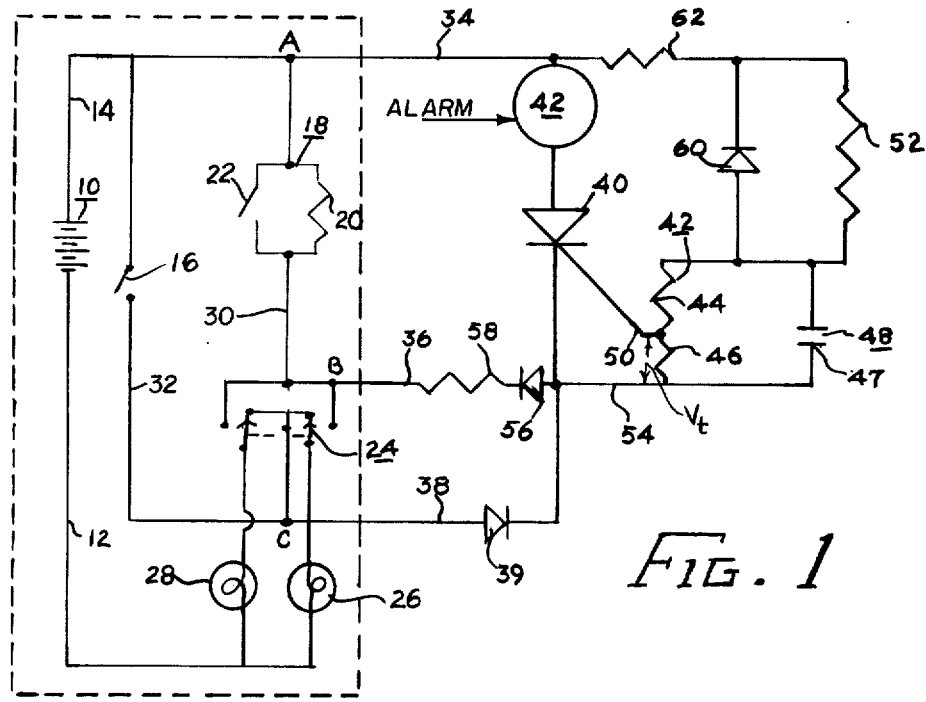
FIG. 1 is a electrical schematic of a simple embodiment of the invention.

Referring now to FIG. 1, the turn signal and brake light circuit which is conventional on most automobiles is shown in the box defined by the broken lines. This circuit includes the automobile battery 10, usually with a negative ground to the vehicle frame to provide a single wire system. As illustrated, however, the circuit is a two-wire circuit with conductors 12 and 14 from the negative and positive terminals of the battery. Conductor 14 extends to the vehicle's brake switch 16 and flasher unit 18. The latter can be the conventional flasher switch having a heating resistor 20 in parallel to a normally open switch 22 with a metallic lever which flexes into the closed position when heated by resistor 20.

The vehicle's turn signal switch 24 is a two-pole, triple-throw switch with the lever poles connected to the vehicle's right and left indicator lights 26 and 28 with conductor 12 completing the circuit to the battery. The conductor 30 from flasher 18 is connected to the opposite poles of switch 24 and the conductor 32 from the vehicle's brake switch 16 is connected to the center pole of the turn signal switch 24. In this circuit, the brake switch closes the circuit to both lights 26 and 28 when the lever of the turn signal switch 24 is in the neutral (center) position and closes the circuit to the opposite light when the lever is in its right or left position.

The timing circuit of the invention is connected to the aforementioned circuit by conductors 34, 36 and 38 which are attached, respectively, to conductor 14, the positive lead, conductor 30 from flasher 18, and conductor 32 from brake switch 16.

The timing circuit employs a silicon controlled rectifier (SCR) which obtains its triggering voltage from a voltage divider across the terminals of a capacitor which is charged by intermittant or pulsed current derived from the turn signal circuit. A holding circuit is provided to maintain current flow through the SCR despite the intermittant or pulsed current flow from the turn signal circuit by connecting the capacitor across the SCR terminals with current limiting means to provide a slow discharge of the capacitor through the closed SCR circuit. An alarm means is in the main circuit of the SCR which also receives pulsating or intermittant current from the turn signal circuit. The timing circuit is also connected to the brake switch of the vehicle so that the closing of the brake switch discharges the capacitor, thereby avoiding the actuation of the alarm when the vehicle is stationary.

The timing circuit employs SCR 40 connected in series with alarm means 42 between conductors 34 and 36. Any suitable audio or visual means or any combination of audio and visual means can be used. The SCR is thereby connected in parallel to the flasher 18. The trigger circuit for the SCR comprises voltage divider 42 formed of resistors 44 and 46 which is connected across the terminals of capacitor 48. The gate terminal of the SCR is connected, by conductor 50, between resistors 44 and 46. The voltage divider means could also be provided by a simple potentiometer with conductor 50 attached to the potentiometer wiper contact.

The capacitor terminals are connected to positive conductor 34 through a high impedance resistor 52 and to the opposite terminal of the SCR by conductor 54. Conductor 54 includes diode 56 and resistor 58. The aforementioned elements provide the charging circuit means for capacitor 48.

The holding circuit for sustaining the conducting mode of the SCR 40 comprises diode 60 connected in parallel to resistor 52 and resistor 62 which is in series with diode 60.

The brake resetting circuit comprises lead 38 and diode 39 which extend from brake switch conductor 32 to the low voltage terminal 47 of capacitor 48 via lead 54.

The operation of the timing circuit is fairly apparent from FIG. 1. When the turn signal switch 24 is closed to either the left or right position, the resultant current flow through resistor 30 of flasher 18 heats the lever 22, causing it to flex into a closed switch position. Current flow through resistor 20 then ceases, lever 22 cools and flexes into an open switch position. When switch 24 is closed to either the left or right position, the voltage at point B is substantially the negative battery voltage when switch 22 opens. Current then can flow to point B. This applies the negative battery voltage to the low voltage terminal 47 of capacitor 48 through resistor 58, diode 56 and conductor 54. This induces charging current flow from point A through current limiting resistor 52 to the capacitor 48. The rate at which capacitor 48 is charged is controlled by the resistance value of resistor 52.

When switch 22 closes, the voltage drop between points A and B diminishes and the charging of the capacitor 48 is interrupted. The capacitor can not discharge, however, through conductor 30 because of diode 56. After a predetermined number of charging pulses, which is determined by the battery potential and the voltage drop across resistor 52, the capacitor reaches a sufficient charge to activate the trigger circuit and gate the SCR into a conducting mode.

The voltage divider provides a triggering voltage, $V_t$, which is a fraction of the charge on capacitor 48. When the voltage $V_t$ becomes sufficient to supply the triggering current for the SCR, the latter is gated into its conducting mode and current can flow through the SCR and alarm 42. This current is a pulsed current induced by the pulsed voltage drop which is generated by flasher 18.

The SCR is retained in a conducting mode by the holding circuit, thereby maintaining the circuit through the alarm closed for a plurality of intermittant pulses of voltage generated by flasher 18. The holding circuit permits capacitor 48 to discharge slowly through diode 60, the alarm circuit and conductor 54. The current flow through the holding circuit is sufficient to retain the SCR in its connecting mode even though the voltage $V_t$ is diminshed to less than sufficient to supply the triggering current.

If the brake pedal is depressed and switch 16 thereby closed, battery voltage is supplied via conductor 38 to the capacitor 48 and this is sufficient to discharge the capacitor through diode 60, thereby resetting the timing circuit and delaying its operation until the brake is released.

A Zener diode could be used in lieu of the voltage divider circuit to trigger the SCR in a more conventional manner. The voltage divider circuit is preferred, however, not only for its lower cost, but also because it provides a less stable triggering circuit at low or partial capacitor potentials. This instability tends to gate the SCR into a conducting mode when the turn signal is cancelled by moving switch 24 to the neutral position which discharges the partial potential on capacitor 48 through the holding circuit and thereby resets the timing circuit without activating the alarm.

Figure 2:
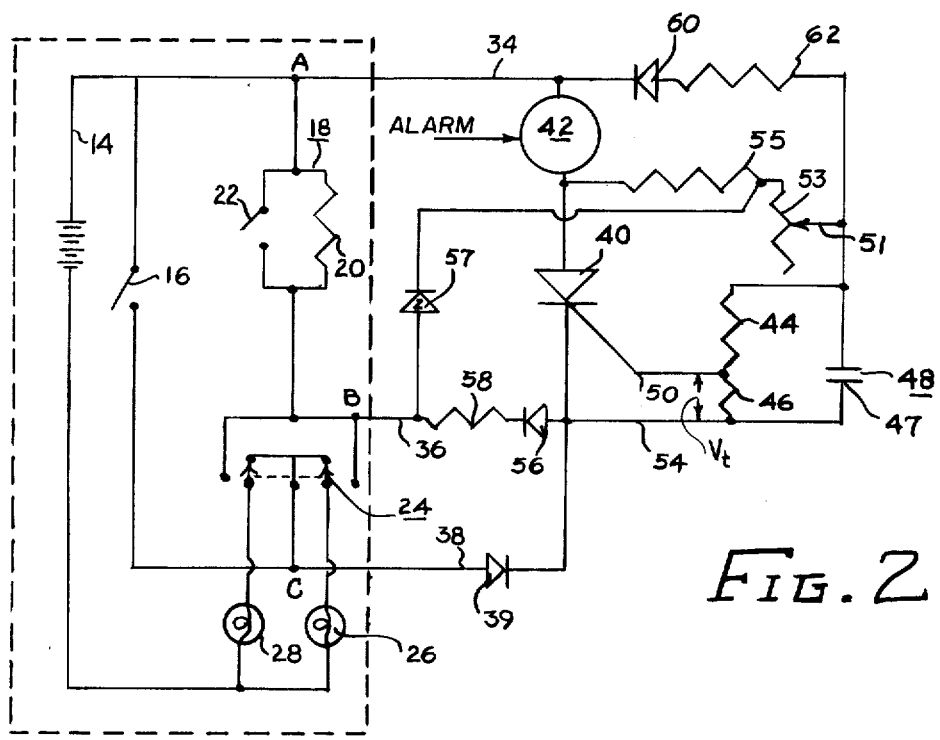
FIG. 2 is a schematic of a circuit having adjusting means in the timing circuit.

FIG. 2 illustrates a timing circuit having voltage regulating means which serves to maintain the preset timing period of turn signal operation constant despite variable battery voltage which can be caused by operation of accessory equipment such as air conditioners, lights, etc. This circuit also provides adjustment means whereby the length of the timed period can be varied in a fixed manner. The brake and turn signal circuitry of the vehicle, shown within the box defined by the broken lines, is the same as that described with reference to FIG. 1. The timing circuit is similarly connected by leads 34, 36 and 38.

The alarm circuit comprises the SCR 40, in series with alarm 42, between conductors 34 and 36. The trigger circuit for the SCR comprises the voltage divider formed by resistors 44 and 46 and conductor 50.

A Zener diode, 57, is connected across the charging circuit. In the illustrated circuit this diode can be connected from conductor 36 to a point between resistor 55 and 53. Resistor 55 limits the current flow through the Zener diode, thereby preventing destruction of the Zener diode. The resistor 55 also provides a minimum value of resistance in the charging circuit. The Zener diode 57 serves as a voltage regulator to insure that the voltage pulses applied across capacitor 48 and resistor 53 are of constant value despite any flucuations in the supply voltage from conductors 12 and 14.

Potentiometer 53 also provides means to adjustably fix the duration of the timing interval since movement of the wiper 51 to a high resistance will decrease the current flow and decrease the time for charging of capacitor 48. Conversely, reducing the resistance of potentiometer 53 will increase the charging current flow and increase the time for charging of the capacitor.

In a typical embodiment of the circuit shown in FIG. 1, for a 12 volt system, resistor 52 has a value of 40 kilohms to provide a charging time for a 500 microfarad capacitor 48 of about 40 seconds to reach a voltage of about 7 volts. Resistor 44 and resistor 46 of the voltage divider network have values of 240 and 20 kilohms, respectively, which provides sufficient triggering current to the SCR (IR 106B1) when the voltage on the capacitor reaches 7 volts. Resistors 62 and 58 have values of 800 and 62 ohms, respectively, and alarm means 42 can have a resistance of about 40 ohms. Diodes of 400 milliwatts power rating are sufficient for use in the circuit.

The invention has been described with regard to the presently preferred embodiments. It is not intended that this description should be unduly limiting of the invention which is intended to be defined by the means and their obvious equivalents set forth in the following claims.

What is claimed is:

1. An electric circuit means useful for timing of the duration of a turn signal circuit of a vehicle having turn signal and brake lights energized by a battery through flasher and manual turn signal switches to generate an intermediate electrical potential and a brake switch which comprises:

first and second conductor means in circuit with said flasher for input of said intermittent electrical potential to said electrical circuit means;

an electronic switch circuit connected across said first and second conductor means and including alarm means and a silicon controlled rectifier having its electrodes in series connection with said alarm means and having a gate terminal;

a timer circuit to operate said electronic switch circuit comprising:

capacitive means in series with a first current limiting resistance means also connected between said first and second conductor means;

voltage divider means including resistance means in parallel connection to said capacitive means and connected across the terminals of said capacitive means;

connector means extending from the gate terminal of said silicon controlled rectifier to an intermediate position on said voltage divider means;

a holding circuit comprising diode means in series with second current limiting resistor means connected between said capacitive means and one side of said electronic switch means and operative to permit discharging current flow from said capacitive means through said electronic switch means during the off portions of the input intermittent potential whereby said electronic switch means is maintained in a conducting mode for a plurality of pulses of said input intermittent potential; and conductor means connecting said brake switch in circuit with said capacitive means and including diode means to permit discharge of said capacitive means when said brake switch is closed.

2. The circuit means of claim 1 wherein voltage regulating means is connected between said first and second conductors in parallel to said capacitive means and said first current limiting resistance means.

3. The circuit means of claim 1 wherein said first current limiting resistance means has means for the fixed adjustability of its resistance.

4. The circuit means of claim 1 wherein said alarm means comprises an audio alarm means.

5. The circuit means of claim 4 wherein said alarm means also includes visual alarm means.

6. The electric circuit means of claim 1 wherein said brake switch is also connected in circuit with said holding circuit.

* * * * *